(12) United States Patent
Saeki

(10) Patent No.: US 6,879,651 B2
(45) Date of Patent: Apr. 12, 2005

(54) PHASE-ADJUSTMENT CONTROL METHOD AND INFORMATION PROCESSING APPARATUS

(75) Inventor: Yuji Saeki, Ebina (JP)

(73) Assignee: Hitachi, Ltd., Tokyo (JP)

( * ) Notice: Subject to any disclaimer, the term of this patent is extended or adjusted under 35 U.S.C. 154(b) by 826 days.

(21) Appl. No.: 09/893,164

(22) Filed: Jun. 26, 2001

(65) Prior Publication Data

US 2002/0048335 A1 Apr. 25, 2002

(30) Foreign Application Priority Data

Jun. 27, 2000 (JP) .......................................... 2000-192185

(51) Int. Cl.[7] .............................................. H04L 25/00
(52) U.S. Cl. ........................................ 375/371; 375/224
(58) Field of Search ................................. 375/371, 224, 375/226, 227, 373; 713/400, 401; 370/516, 517, 519

(56) References Cited

U.S. PATENT DOCUMENTS 5,822,329 A   10/1998   Nakajima et al.

FOREIGN PATENT DOCUMENTS

JP   08-329000    12/1996
JP   2000-196571   7/2000

*Primary Examiner*—Mohammed Ghayour
*Assistant Examiner*—Dung X. Nguyen
(74) *Attorney, Agent, or Firm*—Townsend and Townsend and Crew LLP

(57) ABSTRACT

In a data transmission and reception system, a reception-side unit determines a phase adjustment of received relative to a local clock. The reception-side unit includes a means for computing an optimum delay time based, among other data, on externally provided values which are stored locally. In an alternate embodiment of the invention, a transmission-side unit includes a similar mechanism.

20 Claims, 9 Drawing Sheets

PHASE-ADJUSTMENT CONTROL METHOD AND INFORMATION PROCESSING APPARATUS

CROSS-REFERENCES TO RELATED APPLICATIONS

This application is related to and claims priority from Japanese Patent Application No. 2000-192185, filed on Jun. 27, 2000.

BACKGROUND OF THE INVENTION

In general, the present invention relates to a signal-passing technology for transferring signals between a plurality of units asynchronously operating at the same frequency in an information-processing apparatus such as equipment comprising parallel processors. More particularly, the present invention relates to a phase-adjustment control method for adjusting typically a data signal to the phase of a clock signal so as to correctly take in data conveyed in the data signal and relates to an information-processing apparatus adopting the phase-adjustment control method.

In an information-processing apparatus wherein a number of processors are mounted to operate at the same time, there is adopted a method for correctly exchanging data between the processors whereby data is exchanged simply by the clock frequency and phase, which are uniform throughout all the processors in the apparatus. As the clock frequency is increased to improve the performance, however, variations in the clock phase are no longer comparatively negligible. The variations in the clock phase are caused by, among other things, fabrication variations of LSIs employed in the processors and variations in length among wires between clock generators and the processors. Thus, with this method, the clock frequency cannot be increased to a value higher than an upper limit.

SUMMARY OF THE INVENTION

In accordance with the present invention, a data circuit method and system for producing data from an information signal includes receiving externally provided values, producing a first delay value based on delay times in which data errors occur and on one or more of the externally provided values. The resulting first delay value is used to delay incoming data.

In one aspect of the invention, a second delay value is produced based on the first delay value. The second delay value is used to delay control signals associated with the data. Thus, the control signals may be delayed by an amount different from the data.

In another aspect of the invention, a delay is externally provided on a transmission-side of the data circuit system. The delay is applied to an information signal, comprising the data, control signals, and error correction information such as parity bits, to delay its transmission.

Further in accordance with the invention, a multi-chip device comprises two or more data circuit chips, each of which operates in accordance with the present invention.

Still further in accordance with the invention, a device includes a plurality the data circuit systems as disclosed in the present invention.

DESCRIPTION OF THE SPECIFIC EMBODIMENTS

Figure 1:
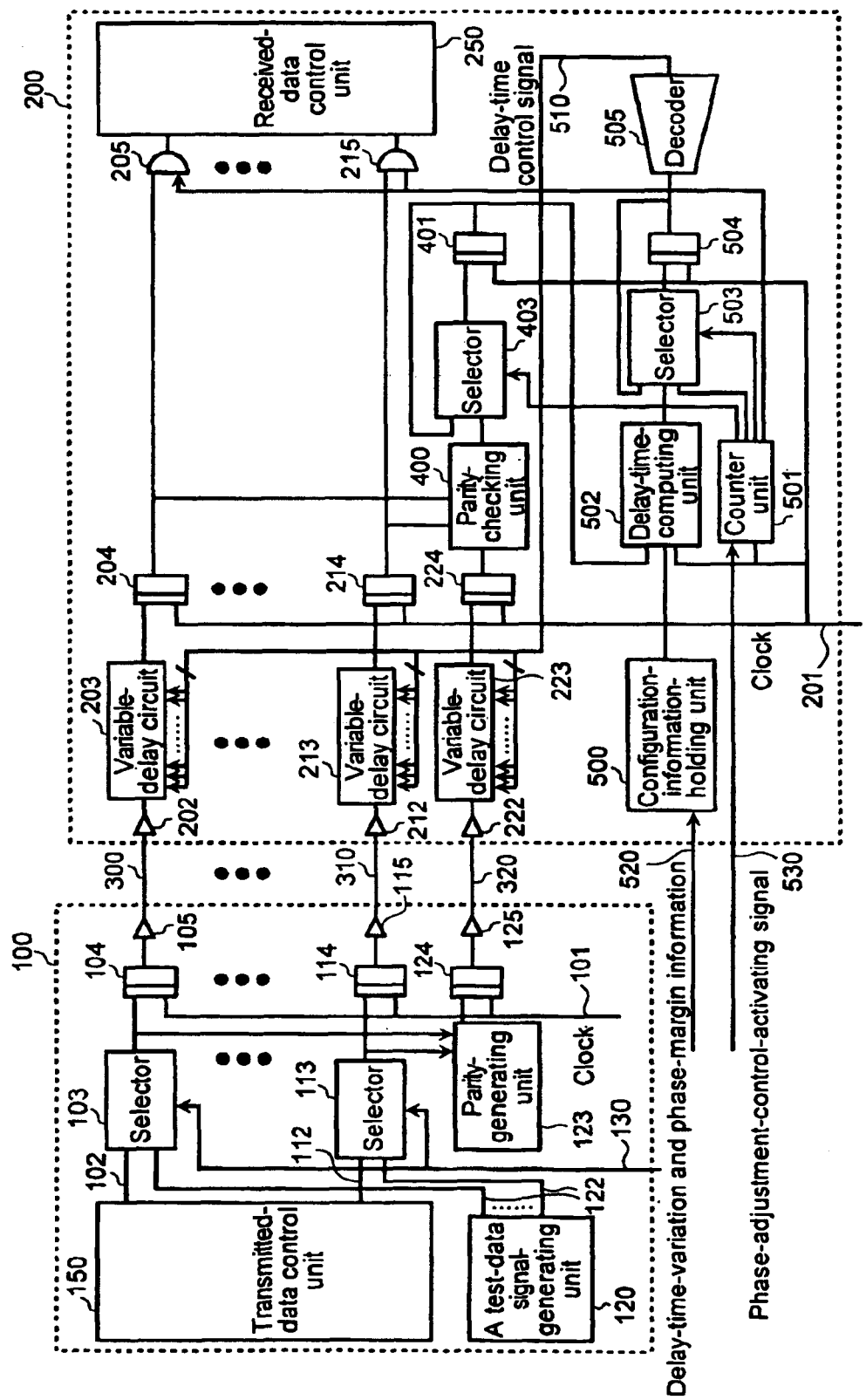
FIG. 1 is a block diagram showing a typical configuration of an embodiment of the present invention.

A reference such as Japanese Patent Laid-Open No. Hei 8-329000 discloses a method for exchanging data between processors driven to operate by clock signals having the same frequency but phases different from each other. In accordance with this method, on a transmission line, there is provided a controllable variable-delay line for allowing a processor on the reception side to correctly receive parallel data consisting of a plurality of bits, which are transmitted by a processor on the transmission side synchronously with a clock signal of the transmitting processor, in synchronization with a clock signal of the receiving processor. A processor on the transmission side transmits a simple pattern as a test-data signal synchronously with a clock signal of the processor. An example of the test pattern is a signal with a frequency of ⅛ of that of the clock signal. A unit on the reception side has a phase comparison and control circuit for controlling the variable-delay circuit automatically by using a result of detection of a phase relation between a clock signal of the reception side and the received data from the test-data signal.

The phase comparison and control circuit compares a result of taking in a $\beta$-delayed signal by using the clock signal of the reception side with a result of taking in a synchronous test-data signal in order to form a judgment as to whether or not the time the received data arrives is close to a clock-pulse time. Here, the $\beta$-delayed signal is a signal obtained by delaying the test-data signal by a predetermined period $\beta$ and the synchronous test-data signal is a test-data signal synchronized to a clock signal delayed from the clock signal of the reception side by a predetermined period of $\alpha$. A result of the judgment indicating received data separated away from the clock signal implies that the received data is separated away from the clock signal by a distance in the range $-\alpha$ to $+\beta$. If the values of $\alpha$ and $\beta$ are greater than variations in delay time due to noises or the like generated in the course of data transmission, the data can be exchanged correctly. If the result of the judgment indicates that received data is close to the clock signal, on the other hand, the variable-delay circuit is controlled to shift the phase of the received data till the received data is judged to be separated away from the clock signal. If the delay time of the variable-delay circuit can be controlled to values in a multi-stage manner, it is easy to satisfy the condition that the received data is separated away from the clock signal by a distance in the range −α to +β. As a result, data can be transferred at a higher frequency.

As described above, in accordance with the method disclosed in Japanese Patent Laid-Open No. Hei 8-329000, variations in total delay time are corrected by detecting a phase relation for a clock signal between a test-data signal transmitted through the actual transmission line at a reset time and initially setting the delay time of the variable-delay circuit, making it possible to transmit data at a rate of once a clock cycle. The total delay time is a total of delay times of LSIs composing the unit on the transmission side, LSIs composing the unit on the reception side and the signal transmission line. The variations in total delay time are caused by LSI-fabrication variations, variations in the clock phase and other variations.

In transmission and reception of parallel data by adoption of this method, detection of phase relations between all bits composing the parallel data and the clock signal allows the variations in total delay time to be corrected with a higher degree of precision. For this reason, it is necessary to design circuits wherein a selector is provided in front of a flip-flop at the last stage of the unit on the transmission side for selecting either a test-data signal or actual data, and phase comparison and phase control can be carried out for all data bits in the unit on the reception side.

There is also a method of detecting a phase relation in received parallel data and a clock signal by checking parity as is disclosed for example in Japanese Patent Laid-Open No. 2000-196571. In accordance with this method, in adjustment of a phase, a selector employed in the unit on the transmission side is actuated to select all bits of test data. The unit on the reception side has a variable-delay circuit capable of controlling the delay time in a multi-stage manner and validity of test-data reception is checked by examining parity for variations of all delay times in order to recognize the received data's delay time, the phase corresponding to which matches the clock signal on the reception side. On the basis of this result of recognition, the delay time of the received data is set at a value corresponding to a phase separated from the clock signal on the reception side by as long a distance as possible. As a result, data can be transmitted correctly without being affected by variations in delay time caused by noises or the like.

A delay time is determined from a result of parity checking by referring to a judgment table. Assume for example that the variable-delay circuit is capable of changing the delay time at 8 stages. In this case, 256 patterns can be obtained as parity-check results. Logic for outputting either an optimum delay time or an error message indicating that an optimum delay time cannot be determined is stored in advance in an LSI on the reception side as a judgment table.

In general, variations in delay time caused by noises or the like are distributed non-uniformly in a direction toward longer delay times and in a direction toward shorter delay times. In order to solve this problem, there is provided a mechanism wherein a delay corresponding to a difference in varying time is included in the variable-delay circuit in advance. Only during phase adjustment is parity checking carried out by adding the delay corresponding to a difference in varying time. After a delay time is determined from the result of the parity checking, the delay corresponding to a difference in varying time is not imposed so that differences in delay-time variations between the direction toward longer delay times and the direction toward shorter delay times are corrected automatically.

In addition, as a test-data pattern, a simple repetitive signal with a pitch smaller than that of actually exchanged data is not used. An example of such a repetitive signal is the one-eighth-frequency signal cited earlier. If a data pattern prone to variations in delay time caused by noises or the like is used instead, effects of a simultaneous switching noise and a cross-talk noise are reflected in a result of phase adjustment. In addition, by reducing the number of necessary correction items, an accurate delay time can be determined.

In the conventional technology disclosed in Japanese Patent Laid-Open No. Hei 8-329000, α and β are determined during the design of an LSI. Thus, if the delay time fluctuates unexpectedly during the actual use of the LSI, the LSI must be redesigned and it takes much time and costs much to correct the LSI.

The LSI must be designed with α and β set at values greater than actual variations in delay time upon consideration of manufacturing variations of the LSI. Thus, there is an upper limit encountered in an attempt to increase the transmission frequency in order to allow for arbitrary phase relations among data and clock signals in all transmitting and receiving units and in order to allow any arbitrary LSI to be used without the need for selection of the LSI.

In addition, effects of variations in power-supply voltage and variations in LSI temperature appear as variations in delay time and, the longer the delay time of the variable-delay circuit, the greater the variations in delay time. However, these effects are not taken into consideration.

In a method whereby a multi-stage variable-delay circuit is used to increase the transmission frequency and an optimum delay time of the circuit is determined from a result of parity checking on parallel data by referring to a judgment table, on the other hand, the number of logic gates required for embedding the judgment table in the LSI logic increases by involution by the stage count of the variable-delay circuit. Thus, an effort to increase the transmission frequency is limited. Also with this method, there is a case in which it is necessary to modify the judgment table in the event of an unexpected variation in delay time occurring in the course of reception of an actual signal. In such a case, the LSI must be redesigned and it takes much time and costs much to correct the LSI.

Also in the method wherein the variable-delay circuit includes an embedded means for correcting a difference in delay-time variation caused by noises or the like between a direction toward longer delay times and a direction toward shorter delay times, there arises a problem of dependence on a delay corresponding to a difference in variation time on manufacturing variations of the LSI and a problem of a cost incurred in the correction of design values.

In the method wherein the design of a fixed transmission delay for all bits composing parallel data is adopted and the phases are adjusted by giving an equal delay time to all the bits composing the parallel data by means of a phase comparison and control circuit provided for each of the bits composing the parallel data, it is necessary to switch from one signal to another among signals output simultaneously in accordance with the design for a case in which a number of signals per LSI are output. Simultaneous-switching noises generated, accompanying changes in current flowing to an output circuit impose a limitation in an effort to increase the transmission frequency or a limit on the number of signal pins that can be provided on each LSI.

When the width of data must be increased for a case, in which LSIs each having a limited signal-pin count are used in order to implement high-performance data transfer control, there is configured a data transfer route in which a number of such LSIs are combined and each of the LSIs is designated as a member in charge of controlling a portion of the data width. In this case, there is a simplest method whereby the LSIs carry out processing synchronously with each other. If a control signal transmitted to accompany data only between certain ones of the LSIs is generated incorrectly in the data transmission route having such a configuration, only control in the erroneous LSI is put in a state different from the other LSIs. In this case, a complicated procedure is required to recover the failure and, a system-down may result in the case of multiple failures. For this reason, with regard to transmission of a control signal, it is desirable to provide some means for avoiding a failure.

It is thus an object of the present invention addressing the problems described above to provide a phase-adjustment control method for making transmission and reception of data at a higher transmission frequency possible by accurately controlling a variable-delay circuit provided on a transmission line for exchanging signals between units driven into operation by clock signals of the same frequency but not necessarily the same phase and used for adjusting the phase of received data relative to a clock signal in a multi-stage manner and to provide an information-processing apparatus adopting the phase-adjustment control method.

In accordance with illustrative example embodiments of the present invention, variations in delay time caused by noise or the like are given as initial set information under software control, or the like, executed by an external controller. Then, in determination of an optimum delay time of a variable-delay circuit for adjusting the phase of received data relative to a clock signal in a multi-stage manner, a range of delay times at which test data cannot be received correctly is identified from, among other information, as a result of parity checking carried out for variations of all delay times. For a delay time located on a boundary beyond which the data can no longer be received correctly, the values of a phase margin and a delay-time variance, which are provided by an external source as adjustment values, are added to or subtracted from the delay time to determine an adjusted delay time at which data can be correctly received without being affected by variations in delay time caused by noises or the like.

Typically, information on variations in delay time, which is given by an external source as initial set information, is computed on the basis of results of evaluation of characteristics of a transmission line and the quantity of noises. The characteristics of a transmission line and the quantity of noises are evaluated at a pre-design stage. The information is given for each unit which is the shortest delay time at which the variable-delay circuit can be controlled. In the event of an unexpected variation in delay time occurring in the course of reception of an actual signal, normally, the variation can be corrected by merely changing the initial set information stored in an external storage device. In addition, by giving information on variations in delay time in registers provided separately for a direction toward longer delay times and a direction toward shorter delay times, correction can be implemented in an easily correctable format without including a delay corresponding to a difference in variation time between the directions in the variable-delay circuit.

Moreover, unless the variable-delay circuit's variations in delay time caused by manufacturing variations of LSIs are each stored in advance as a phase margin, any arbitrary LSIs cannot be used without properly selecting the LSIs. Thus, it is necessary to give the phase margins as information on variations in delay time in the registers provided separately for the direction toward longer delay times and the direction toward shorter delay times. At a relatively low data transmission frequency, a large value of the phase margin can be given from an external source so that optimization of the phase margin can be implemented by merely changing the initial set information even if a variation in transmission frequency exists.

In a particular illustrative embodiment of the invention, an optimum delay time of the variable-delay circuit is determined by adoption of a first method whereby the value of a delay-time variance and the value of a phase margin are subtracted from a delay time located on a boundary to give a result of subtraction in a direction toward shorter delay times wherein the boundary is a border between a range of delay times at which a test-data signal can be received correctly and a range of delay times at which a test-data signal cannot be received correctly as indicated by a result of parity checking or the like.

As a second method, an optimum delay time of the variable-delay circuit is determined by adoption of a method whereby the value of a delay-time variance and the value of a phase margin are added to a delay time located on a boundary to give a sum in a direction toward longer delay times wherein the boundary is a border between a range of delay times at which a test-data signal cannot be received correctly by using a specific clock pulse as a gating clock pulse and a range of delay times at which a test-data signal can be received correctly by using a clock pulse immediately succeeding the specific clock pulse as a gating clock pulse as indicated by a result of parity checking or the like.

In addition, at a high transmission frequency, there exists a range of delay times at which test data cannot be received correctly even by using the immediately succeeding clock pulse as a gating clock pulse. For such a case there is also provided a third method for determining an optimum delay time computed as an average of first and second values wherein the first value is obtained by adoption of the first method and the second value is computed by adoption of the second method except that the boundary is a border between a range of delay times at which a test-data signal can be received correctly by using the immediately succeeding clock pulse as a gating clock pulse and a range of delay times at which a test-data signal cannot be received correctly by using the immediately succeeding clock pulse as a gating clock pulse as indicated by a result of parity checking or the like.

A means capable of computing an optimum delay time by adoption of the three methods described is provided along with a means for identifying a boundary between a range of delay times at which a test-data signal can be received correctly and a range of delay times at which a test-data signal cannot be received correctly as indicated by a result of parity checking or the like, or a boundary between a range of delay times at which a test-data signal cannot be received correctly by using a specific clock pulse as a gating clock pulse and a range of delay times at which a test-data signal can be received correctly by using a clock pulse immediately succeeding the specific clock pulse as a gating clock pulse as indicated by a result of parity checking or the like.

If it is possible to adopt the first method whereby the value of a delay-time variance and the value of the phase margin are subtracted from a boundary to give a result of subtraction in a direction toward shorter delay times, that is, if it is possible to adopt a method corresponding to a case in which test data can be still correctly received at a sufficient margin even with the delay time of the variable-delay circuit reduced to a possible minimum value, the delay time found by adoption of this method is selected as an optimum one of the delay times found by adoption of the three methods described above.

If it is impossible to adopt this first method, on the other hand, one of the delay times found by adoption of the remaining two methods, namely, the second and third methods, is selected as an optimum delay time depending on whether or not there is a range of delay times at which test data cannot be received correctly even by using the immediately following clock pulse as a gating clock pulse. In accordance with this order of selection of an optimum delay time, it is possible to suppress the effects of variations in power-supply voltage and variations in LSI temperature, which both appear as a delay-time variance, wherein the longer the delay time of the variable-delay circuit, the greater the delay-time variance. Thus, a phase margin can be secured even if the range of delay times at which test data cannot be received correctly changes arbitrarily due to the fact that a phase relation of a data signal and a clock signal on a unit on the transmission side is different from a phase relation of the data signal and a clock signal on a unit on the reception side.

For a circuit allowing the phase relation between data and a clock signal to be changed arbitrarily as described above, the number of signals output by the LSI on the transmission side may be large so that simultaneous-switching noises become a problem. In this case, a multi-stage variable-delay circuit is provided also on the transmitting side to make the phase of output data variable and, hence, to eliminate the noises.

In addition, in accordance with a method based on logic of combination of registers and adders using no judgment table as described above, a delay time is determined without entailing an increase in number of logic gates required for embedding the judgment table in the logic by involution by the stage count of the variable-delay circuit. Thus, the number of stages in the variable-delay circuit for adjusting the delay time can be increased to allow the adjustment of the phase to be done in finer units. As a result, the data transmission frequency can be increased.

Illustrative embodiments of the present invention will now be described by referring to the diagrams as follows. FIG. 1 is a block diagram showing a typical configuration of an embodiment implementing an information-processing apparatus provided by the present invention. In FIG. 1, reference numerals 100 and 200 denote a transmission-side unit and a reception-side unit respectively. Reference numerals 300, 310 and 320 each denote a transmission line connecting the transmission-side unit 100 to the reception-side unit 200. The transmission-side unit 100 comprises a test-data-generating unit 120, a transmitted-data control unit 150, a selector 103, another selector 113, a parity-generating unit 123, a flip-flop 104, another flip-flop 114, a further flip-flop 124, an output buffer 105, another output buffer 115 and a further buffer 125. On the other hand, the reception-side unit 200 comprises an input buffer 202, another input buffer 212, a further input buffer 222, a variable-delay circuit 203, another delay circuit 213, a further delay circuit 223, a flip-flop 204, another flip-flop 214, a further flip-flop 224, an AND gate 205, another AND gate 215, a received-data control unit 250, a parity-check unit 400, a check-result latch circuit 401, a selector 403, another selector 503, a configuration-information-holding unit 500, a counter unit 501, a delay-time-computing unit 502, a delay-time latch unit 504 and a decoder 505.

The transmission-side unit 100 operates in accordance with a clock signal 101 and the reception-side unit 200 operates in accordance with a clock signal 201. The clock signals 101 and 201 are generated by a common clock generator not shown in the figure. Thus, it can be assumed that, even though the clock signals 101 and 201 have the same frequency, they may not necessarily have the same phase due to, among other causes, differences in delay time between their supply routes.

In a normal transmission of data, the transmitted-data control unit 150 employed in the transmission-side unit 100 outputs a data signal 102 to the transmission line 300 by way of the selector 103, the flip-flop 104 and the output buffer 105 synchronously with the clock signal 101 to transmit the data signal 102 to the reception-side unit 200. In the reception-side unit 200, the data signal 102 is supplied to the flip-flop 204 synchronously with the clock signal 201 by way of the input buffer 202 and the variable-delay circuit 203. The transmission-side unit 100 also transmits a control signal 112 accompanying the data signal 102 synchronously with the clock signal 101 to the reception-side unit 200 by way of the selector 113, the flip-flop 114, the output buffer 115 and the transmission line 310. In the reception-side unit 200, the control signal 112 is supplied to the flip-flop 214 synchronously with the clock signal 201 by way of the input buffer 212 and the variable-delay circuit 213. A signal output by the flip-flop 214 is supplied to the received-data control unit 250 by way of the AND gate 215. By the same token, a signal output by the flip-flop 204 is supplied to the received-data control unit 250 by way of the AND gate 205.

On the reception-side unit 200, the variable-delay circuit 203 is provided between the input buffer 202 and the flip-flop 204 for delaying a data signal output by the input buffer 202 to the flip-flop 204 so that the data signal originated from the flip-flop 104 on the transmission-side unit 100 synchronously with the clock signal 101 is supplied to the flip-flop 204 on the reception-side unit 200 synchronously with the clock signal 201. By the same token, on the reception-side unit 200, the variable-delay circuit 213 is provided between the input buffer 212 and the flip-flop 214 for delaying a control signal output by the input buffer 212 to the flip-flop 214 so that the control signal originated from the flip-flop 114 on the transmission-side unit 100 synchronously with the clock signal 101 is supplied to the flip-flop 214 on the reception-side unit 200 synchronously with the clock signal 201. The data and control signals are delayed so that they are received by the reception-side unit 200 synchronously with a pulse of the clock signal 201 of the same time.

The phase of the data signal 102 relative to a pulse of the clock signal 201 determining a timing to supply the data signal to the flip-flop 204 may differ from the phase of the control signal 112 relative to the same pulse supplying the control signal to the flip-flop 214 by a variable time duration due to, among others, differences in device driving power or the like caused by manufacturing variations of the LSIs and differences in delay time between the transmission line 300 and the transmission line 310. In an even worse case, the pulse of the clock signal 201 may be separated away from the pulse of the clock signal 201 by a period of the clock signal 201. In another case, the outputs of the flip-flops 204 and 214 may enter an indeterminate state, that is, a state in which the flip-flop 204 or 214 may or may not be outputting a signal. The variable-delay circuits 203 and 213 delay both the data and control signals 102 and 112 respectively by predetermined periods of time so that the pulse of the clock signal 201 is the same as the pulse of the clock signal 201 so that the variable time duration, by which the phase of the data signal 102 relative to the pulse differs from the phase of the control signal 112 relative to the same pulse, is eliminated.

A delay control signal 510 controls delay times of the variable-delay circuits 203 and 213. As will be described later, a delay time conveyed by the delay control signal 510 is determined by the delay-time-computing unit 502 by calculation based on the values of delay-time variances and phase margins provided in advance by an external source such as a signal 520 and stored in rewrite-able memory contained the configuration-information-holding unit 500. The delay time is set at such a value that test data 122 output by the test-data-generating unit 120 is received correctly by the flip-flops 204 and 214. The parity-checking unit 400 produces a data error indication signal indicative of whether or not the test data 122 has been received correctly by the flip-flops 204 and 214.

A parity bit generated by the parity-generating unit 123 is transmitted synchronously with the clock signal 101 through the flip-flop 124 to the reception-side unit 200 and supplied to the parity-checking unit 400 by way of the flip-flop 224 synchronously with the clock signal 201. The route traveled by the parity bit from the flip-flop 124 to the flip-flop 224 is similar to the route traveled by the data signal 102 from the flip-flop 104 to the flip-flop 204 and the route traveled by the control signal 112 from the flip-flop 114 to the flip-flop 214. In a particular illustrative embodiment, in the transmission-side unit 100, the circuit configuration of the flip-flop 124 is identical with those of the flip-flops 104 and 114 whereas the circuit configuration of the output buffer 125 is identical with those of the output buffers 105 and 115. In the reception-side unit 200, on the other hand, the circuit configuration of the input buffer 222 is identical with those of the input buffers 202 and 212, the circuit configuration of the variable-delay circuit 223 is identical with those of the variable-delay circuits 203 and 213 whereas the circuit configuration of the flip-flop 224 is identical with those of the flip-flops 204 and 214. It is also desirable to design the transmission-side unit 100 and the reception-side unit 200 into such circuit configurations that the lengths of wires between components along the route traveled by the parity bit are, if possible, the same as those along the route traveled by the data signal 102 and those along the route traveled by the control signal 112. In addition, the load count of each component along the route traveled by the parity bit is, if possible, made equal to that along the route traveled by the data signal 102 and that along the route traveled by the control signal 112. It is also desirable to implement the transmission lines 300, 310 and 320 by transmission lines having the same conditions such as the same wire length.

The parity-checking unit 400 checks every case in which test data is delayed by any of possible delay times generated by each of the variable-delay circuits 203, 213 and 223, that is, for any of possible delay-stage counts of each of the variable-delay circuits 203, 213 and 223. Results of parity checking generated by the parity-checking unit 400 are stored as data error indication signals in the latch circuit 401. The latch circuit accommodates as many latches as delay stages of each of the variable-delay circuits 203, 213 and 223. That is to say, a result of parity checking for each delay time is stored in one of the latches. The counter unit 501 is provided to generate a delay control signal 510 for sequentially changing the delay times of the variable-delay circuits 203, 213 and 223. The counter unit 501 is driven by a phase-adjustment control signal 530 to start counting. A count value generated by the counter unit 501 is supplied to the decoder 505 for decoding the count value by way of the selector 503 and the latch circuit 504. As a result of the decoding, the decoder 505 sequentially outputs the delay control signal 510.

The following description explains a phase-adjustment operation carried out by the embodiment. First of all, before starting the phase-adjustment operation, software for controlling system activation or the like provides the values of delay-time variances and phase margins to the rewrite-able memory in the configuration-information-holding unit 500 as the signal 520 originated by an external source. Then, a signal 130 drives the selector 103 and the selector 113 to select test data. With test data 122 selected, an operation to output the test data 122 and its parity bit synchronously with the clock signal 101 from the transmission-side unit 100 is started.

In the reception-side unit 200, the phase-adjustment-control-activating signal 530 is supplied to the counter unit 501 in order to activate control of phase adjustment. The counter unit 501 drives the selector 503 to select a delay control signal originated by the counter unit 501. The selector 503 passes on the delay control signal 510 to the variable-delay circuits 203, 213 and 223 by way of the latch circuit 504 and the decoder 505, driving the variable-delay circuits 203, 213 and 223 to sequentially change their delay times from the minimum to the maximum.

In the mean time, the parity-checking unit 400 takes in pieces of test data from the flip-flops 204 and 214 and a parity bit from the flip-flop 224 synchronously with the clock signal 201, checking parity for each of the delay times. The parity-checking unit 400 supplies results of parity checking to the latch circuit 401 by way of the selector 403. At a point of time results of parity checking for all the delay times are collected, the counter unit 501 activates the delay-time-computing unit 502 and drives the selector 503 to select a signal output by the delay-time-computing unit 502. The delay-time-computing unit 502 determines an optimum delay time, generating the delay control signal 510 for the optimum delay time in reception of an actual data signal. The delay-time-computing unit 502 determines an optimum delay time by referring to the results of parity checking stored in the latch circuit 401 for all the delay times ranging from the shortest to the longest as well as information on delay-time variances and phase margins, which is stored in the configuration-information-holding unit 500.

Once the delay time of the variable-delay circuits 203 and 213 is determined as described above, in the transmission-side unit 100, the signal 130 drives the selectors 103 and 113 to select data and control signals 102 and 112 generated by the transmitted-data control unit 150. In the reception-side unit 200, on the other hand, the AND gates 205 and 215 are opened to pass on the data and control signals respectively to the received-data control unit 250.

Next, the delay-time-computing unit 502 is explained in detail by referring to FIGS. 2 to 5. The explanation begins with a description of the delay-time computation's problem of phase relations between the clock signal 201 and signals input to the flip-flops 204, 214 and 224 with reference to FIG. 2. Let a symbol T denote the period of the clock signal 201. If the parity-checking unit 400 determines that a test signal is not received correctly, phase adjustment will be needed in reception of an actual signal, that is, the variable-delay circuits 203, 213 and 223 need to be set at a proper delay time.

First of all, assume that each of the variable-delay circuits 203, 213 and 223 are each set at the minimum delay time. Let an indeterminate-time range of the input signal be denoted by 2×A1. The indeterminate-time range is a range in which an input signal may or may not arrive correctly. This is the time range during which the output logic which provides the data is switching from one level to the other and is thus indeterminate. If a rising edge $Z_1$ of a pulse of the clock signal 201 falls within the intermediate-time range of an input signal, the result of the parity checking will indicate that the input signal cannot be received correctly as is the case with delay stages 4, 8, 24 and 25 shown in FIG. 2. An extension of the indeterminate-time range of the input signal in a direction toward shorter delay times is denoted by a symbol B1 and an extension of the indeterminate-time range of the input signal in a direction toward longer delay times is denoted by a symbol C1. Let a symbol D1 denote a difference in phase obtained as a result of subtraction of the rising-edge time of a pulse of the clock signal 201 from the center of the indeterminate-time range of input signal.

Symbols Aj, Bj, Cj and Dj used in the following description denote half the indeterminate-time range (Aj), an extension of the indeterminate-time range in a direction toward shorter delay times (Bj), an extension of the indeterminate-time range in a direction toward longer delay times (Cj), and the difference in phase (Dj) for the other delay times of the variable-delay circuits 203, 213 and 223 where j=2 to N, j being a delay number corresponding to a delay time and the notation N denotes the total number of delay stages included in each of the variable-delay circuits 203, 213 and 223. Thus, FIG. 2 represents the position of the indeterminate range relative to the clock edge Z1 for each delay time, represented by the delay number j.

The delay number corresponds to the number of delay stages used to produce the delay. Thus a delay time is associated with a delay number, which in turn is an indication of the number of delay stages used to produce the delay. Thus, by convention, a longer delay time is associated with a larger delay number, indicating the use of more delay stages. A shorter delay time is associated with a smaller delay number and thus a smaller number of delay stages.

Considering the fact that the phase difference Dj between the clock signal and the input signal is a signed result of subtraction, the difference in phase increases with the delay time introduced in the variable-delay circuits 203, 213 and 223. Let symbols D1, D2, - - - , and Dn denote the differences in phase for a variety of delay times ranging from the shortest to the longest. Variations in inter-bit delay time are caused by manufacturing variations of the same LSI chip, which are reflected in half the indeterminate-time range Aj of the input signal where j=1 to n. There are also effects of variations in power-supply voltage and variations in LSI temperature. These variations are reflected in the extension Bj of the indeterminate-time range 2×Aj of the input signal in the direction toward shorter delay times and the extension Cj of the indeterminate-time range 2×Aj of the input signal in the direction toward longer delay times where j=1 to n. The variations in inter-bit delay time and these effects appear as a total indeterminate-time range of the input signal and, the longer the delay time of the variable-delay circuits 203, 213 and 223, the larger the total indeterminate-time range. For the phase differences D1, D2, - - - , and Dn, the total indeterminate-time ranges of the input signal comprise increasing indeterminate-time ranges 2×A1, 2×A2, - - - , and 2×An, increasing extensions B1, B2, - - - , and Bn in the direction toward shorter delay times and increasing extensions C1, C2, - - - , and Cn in the direction toward longer delay times respectively. The result of parity checking for a delay time j indicates that test data can be received correctly unless the rising edge of the pulse of the clock signal 201 coincides with the indeterminate-time range 2×Aj in which case phase adjustment is required to replace the delay time j with another value.

Figure 2:
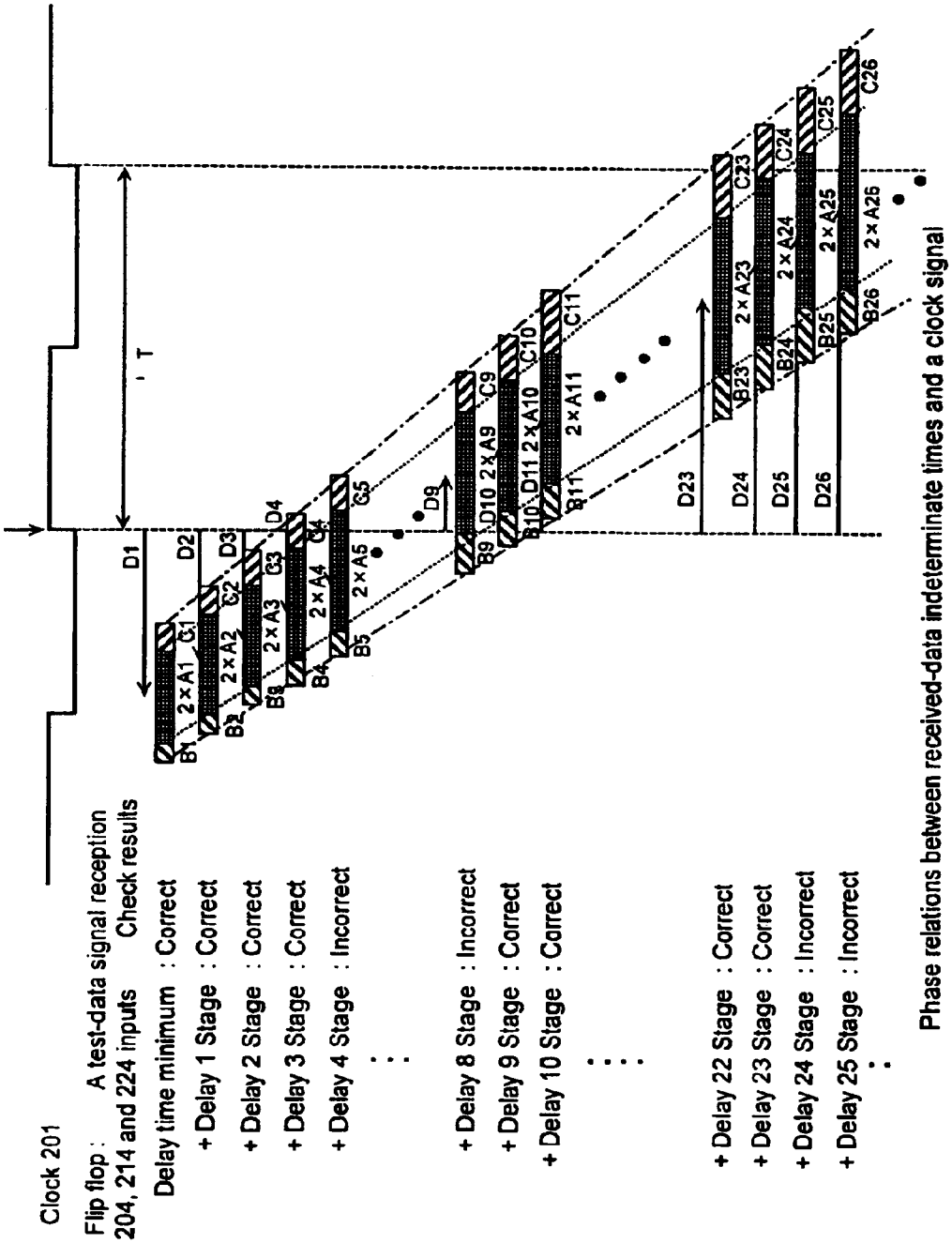
FIG. 2 is a diagram showing phase relations between received-data and clock signals.
Figure 3:
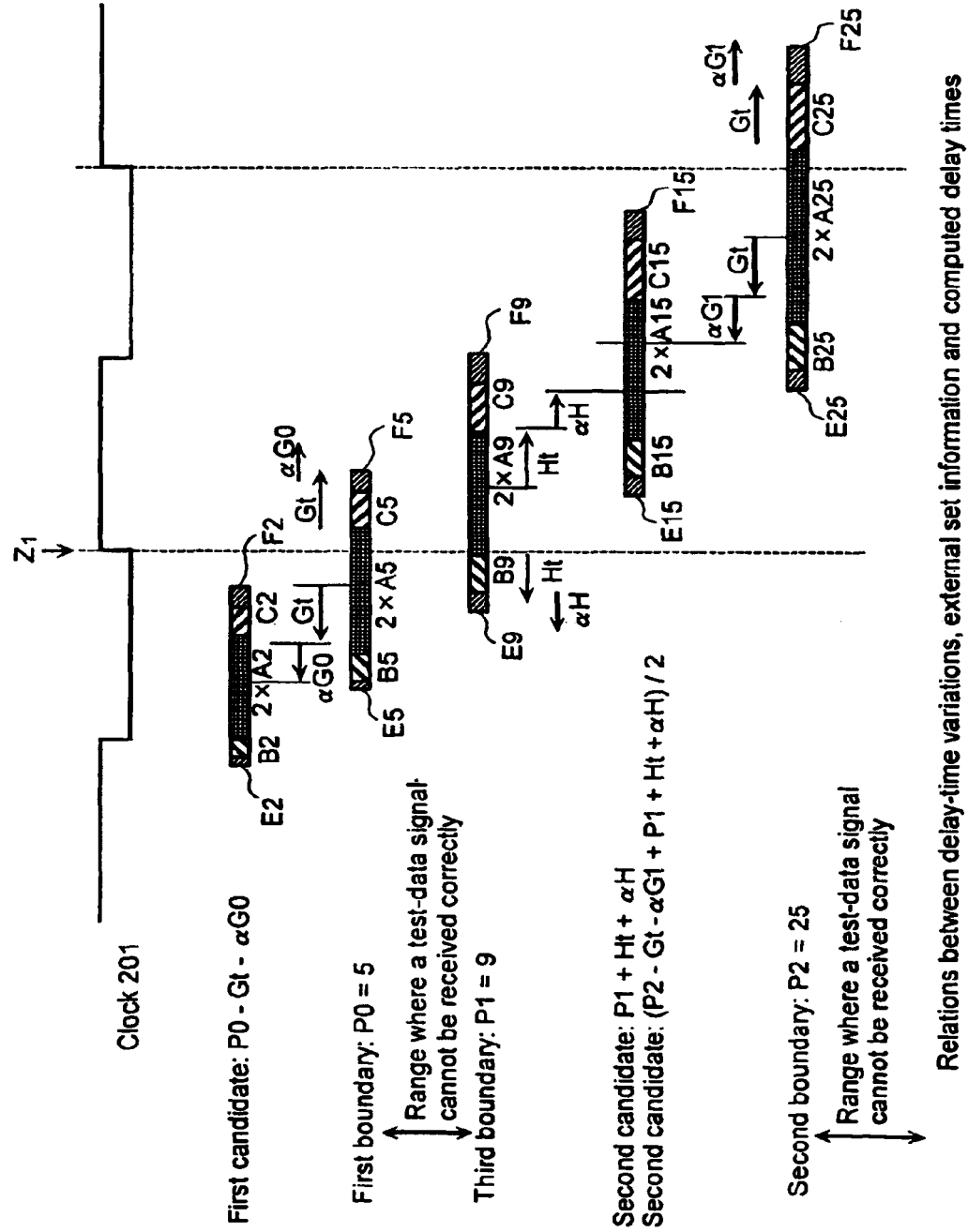
FIG. 3 is a diagram showing relations between an optimum delay time and a delay-time variance as well as a phase margin, which are supplied by an external source.

The following description explains an optimum delay time determined by the delay-time-computing unit 502 from the results of parity checking of test data obtained for the typical phase relations of FIG. 2 and stored in the latch circuit 401 as well as information on delay-time variances and phase margins, which is provided by an external source and stored in the configuration-information-holding unit 500 by referring to FIG. 3.

In the typical phase relations shown in FIG. 2, the result of the parity checking indicates that a test-data signal cannot be received correctly for a delay-stage range starting with the $5^{th}$ delay stage (delay stage 4 or a first boundary P0=5) and ending with the $9^{th}$ delay stage (delay stage 8 or a third boundary P1=9) as well as a delay-stage range starting with the $25^{th}$ delay stage (delay stage 24 or a second boundary P2=25). FIG. 3 is a diagram showing indeterminate-time ranges for the $2^{nd}$ delay stage, the $5^{th}$ delay stage, the $9^{th}$ delay stage, the $15^{th}$ delay stage and the $25^{th}$ delay stage of the variable-delay circuits 203, 213 and 223.

If the delay time is shorter than the delay time on the first boundary (P0=5), the test data can be received correctly. In reception of an actual signal, however, the extension C5 of the indeterminate-time range 2×A5 represents a probability that the actual signal may not be received correctly due to a noise of the power-supply voltage, a variation in LSI temperature or the like. By the same token, if the delay time is shorter than the delay time on the second boundary (P2=25), the test-data signal can be received correctly by using the immediately following pulse of the clock signal 201. In reception of an actual signal, however, the extension C25 of the indeterminate-time range 2×A25 represents an additional probability that the actual signal may not be received. Conversely speaking, if the delay time is longer than the delay time on the third boundary (P1=9), the test-data signal can be received correctly by using the immediately following pulse of the clock signal 201. In reception of an actual signal, however, the extension B9 of the indeterminate-time range 2×A9 represents a probability that the actual signal may not be received correctly.

The lengths of the extensions Bj and Cj can be estimated from characteristics of the transmission lines. In a particular illustrative embodiment, the extension Bj and the extension Cj can each be computed by multiplying the sum of the amount of power-supply voltage noise and a variation in temperature by a coefficient of sensitivity and then multiplying a product obtained as a result of the multiplication by a total of LSI gate delays. The extension Bj and the extension Cj can be supplied from an external source as Ht and Gt respectively. Registers for storing Gt and Ht are provided in the configuration-information-holding unit 500. In a particular illustrative embodiment, the values of Gt and Ht are each rounded up to an integer expressing the extensions in terms of smallest design units used in the adjustment of the delay time of each of the variable-delay circuits 203, 213 and 223. From the above description, the lengths of the actual extensions Bj and Cj are each proportional to a total of LSI gate delays. On the other hand, the values of Gt and Ht are each a total of LSI gate delays and represent respectively the maximum values of the Cj and the Bj of the variable-delay circuits 203, 213 and 223.

If LSI process variations increase the indeterminate-time range 2×Aj, the extensions Cj and Bj become respectively greater than the values of Gt and Ht derived from the design values of the variable-delay circuits 203, 213 and 223. Thus in accordance with the present invention, the extensions B2, B5, B9, B15 and B25 are increased by increments E2, E5, E9, E15 and E25, respectively, whereas the extensions C2, C5, C9, C15 and C25 are increased by increments F2, F5, F9, F15 and F25, respectively, as shown in FIG. 3. Since (C5+F5) exceeds Gt, αG0 needs to be added to Gt. By the same token, since (C25+F25) exceeds Gt, αG1 needs to be added to Gt. Likewise, since (B9+E9) exceeds Ht, αH needs to be added to Ht. For this reasons, the configuration-information-holding unit 500 is provided with registers for storing αG0, αG1 and αH, which are provided from an external source, in addition to the registers for storing Gt and Ht. αG0 is a phase margin added to Gt in the direction of longer delay times on the first boundary P0. αG1 is a phase margin added to Gt in the direction of longer delay times on the second boundary P2. αH is a phase margin added to Ht in the direction of shorter delay times on the third boundary P1. The values of αG0, αG1 and αH are each expressed in terms of smallest design units used in the adjustment of the delay time of each of the variable-delay circuits 203, 213 and 223. As described above, in the direction of longer delay times, two different pieces of phase margin information, namely, αG0 and αG1, can be set for the first and second boundaries P0 and P2. Two different values are required because the difference in delay time between the first and second boundaries P0 and P2 with the clock signal 201 taken as a gating clock pulse is about 1 cycle (1 period of the clock signal 201) and the increase of 1 period in delay time caused by this difference cannot be ignored.

Figure 4:
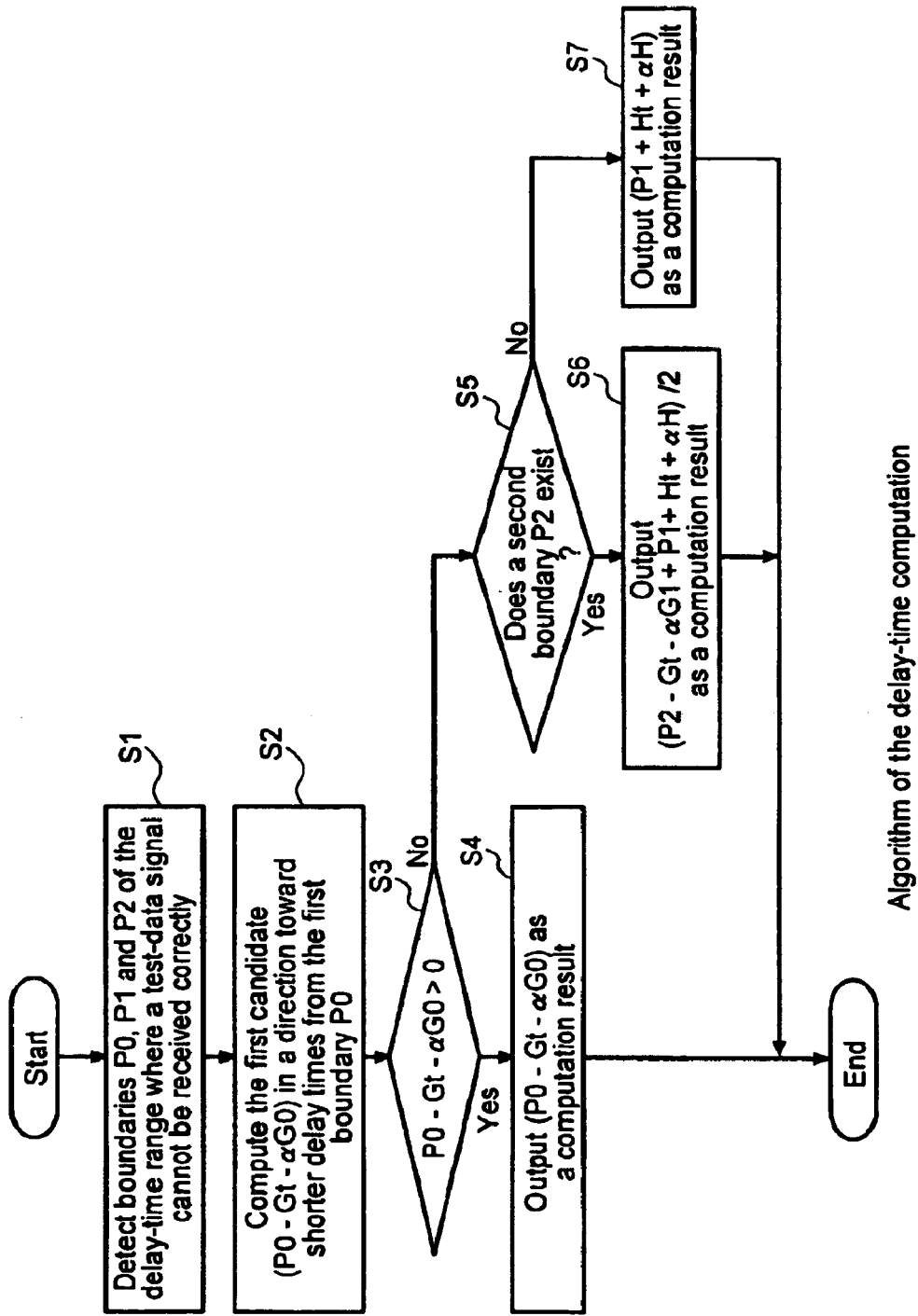
FIG. 4 shows a flowchart representing an algorithm adopted by a delay-time-computing unit shown in FIG. 1 for finding an optimum delay time.

FIG. 4 shows a flowchart representing an illustrative algorithm in accordance with the present invention as used in the delay-time-computing unit 502 for finding an optimum delay time. As shown in the figure, the flowchart begins with a step S1 at which the delay-time-computing unit 502 identifies initial delay times P0, P1 and P2 each serving as a delay-time boundary value between a range of delay times at which a test-data signal can be received and a range of delay times at which a test-data signal cannot be received. At the next step S2, the delay-time-computing unit 502 computes the value of an expression (P0−Gt−αG0) in a direction toward delay times shorter than a delay time P0 which serves as the first boundary as the first candidate. Here, for the purpose of the algorithm of FIG. 4, P0 represents the delay time of the 5$^{th}$ delay stage (delay stage 4, FIG. 2). Similarly, P1 represents the delay time of the 9$^{th}$ delay stage (delay stage 8), and P2 represents the delay time of the 25$^{th}$ delay stage (delay stage 24).

At the next step S3, the delay-time-computing unit 502 forms a judgment as to whether or not the first candidate is positive. If the result of the judgment is YES indicating that the first candidate is positive, the flow of the algorithm goes on to a step S4 at which the first candidate is output as an optimum delay time.

If the result of the judgment formed at the step S3 is NO indicating that the first candidate is not positive, on the other hand, the flow of the algorithm goes on to a step S5 at which the delay-time-computing unit 502 forms a judgment as to whether or not a delay time P2 which serves as the second boundary was identified at the step S1. This is because the method for computing an optimum delay time differs depends on whether or not the delay time P2 was identified at the step S1. If the result of the judgment formed at the step S5 is NO indicating that the delay time P2 was not identified at the step S1 (this might occur, for example, when the data transmission frequency is low in comparison with the longest delay time of the variable-delay circuit) the flow of the algorithm goes on to a step S7 at which the delay-time-computing unit 502 outputs a second candidate represented by the value of an expression (P1+Ht+αH) as an optimum delay time. If the result of the judgment formed at the step S5 is YES indicating that the delay time P2 was identified at the step S1, on the other hand, the flow of the algorithm goes on to a step S6 at which the delay-time-computing unit 502 computes the value of an expression (P2−Gt−αG1+P1+Ht+αH)/2 as an alternate second candidate and outputs this second candidate as an optimum delay time.

Figure 5:
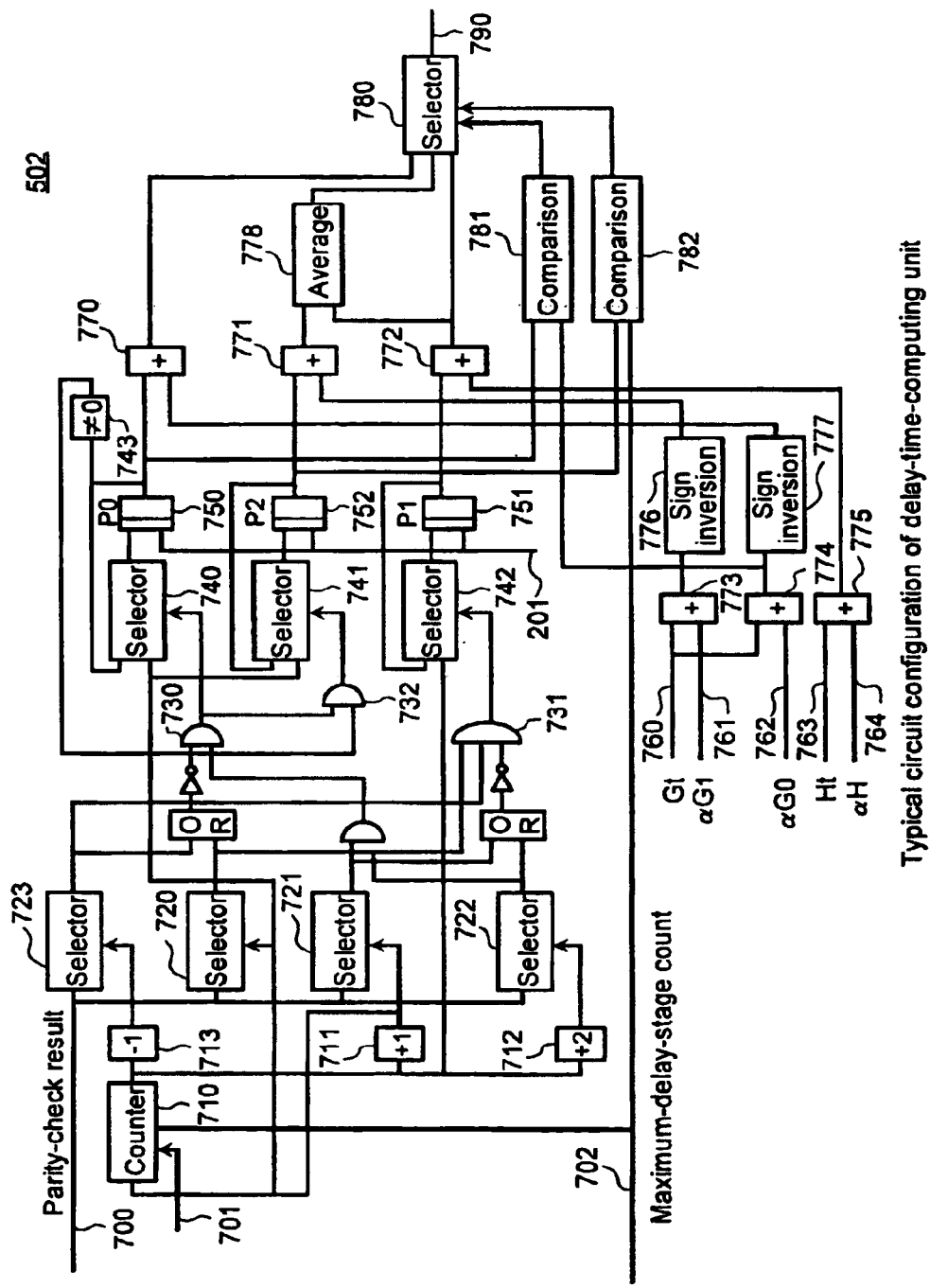
FIG. 5 is a diagram showing a typical circuit configuration of the delay-time-computing unit implementing the algorithm represented by the flowchart shown in FIG. 4.

FIG. 5 is a diagram showing a typical circuit configuration of the delay-time-computing unit 502 implementing the algorithm represented by the flowchart shown in FIG. 4. The counter unit 501 supplies a signal 701 to the delay-time-computing unit 502 to indicate that the parity checking on a test-data signal has been completed for all delay stages representing a variety of delay times ranging from the shortest to the longest. Triggered by the signal 701, a counter 710 employed in the delay-time-computing unit 502 starts counting the delay stages of the variable-delay circuits to search delay stages representing the delay times P0 and P2 on a boundary between a range of delay times at which the test-data signal can be received correctly and a range of delay times at which the test-data signal cannot be received correctly and the delay time P1 on a boundary between a range of delay times at which a test-data signal cannot be received correctly by using a specific clock pulse as a gating clock pulse and a range of delay times at which a test-data signal can be received correctly by using a clock pulse immediately succeeding the specific clock pulse as a gating clock pulse. The delay times P0, P1 and P2 are identified from parity-checking results 700 output by the latch circuit 401 and stored in flip-flop sets 750, 751 and 752. A selector 720 detects a result of parity checking for a delay time indicated by the contents of the counter 710. In the same way, a selector 721 detects a result of parity checking for a delay time indicated by the contents of a +1 circuit 711, which are equal to the contents of the counter 710 plus one. The delay time indicated by the contents of the +1 circuit 711 lags behind the delay time indicated by the contents of the counter 710 by one delay-time stage. By the same token, a selector 722 detects a result of parity checking for a delay time indicated by the contents of a +2 circuit 712, which are equal to the contents of the counter 710 plus two. The delay time indicated by the contents of the +2 circuit 712 lags behind the delay time indicated by the contents of the counter 710 by two delay-time stages. Likewise, a selector 723 detects a result of parity checking for a delay time indicated by the contents of a −1 circuit 713, which are equal to the contents of the counter 710 minus one. The delay time indicated by the contents of the −1 circuit 713 leads ahead of the delay time indicated by the contents of the counter 710 by one delay-time stage. AND gates 730 and 732 each detect an event in which the parity checking shows a change from a result indicating that a test-data signal can be received correctly to a result indicating that a test-data signal cannot be received correctly. On the other hand, an AND gate 731 detect an event in which the parity checking shows a change from a result indicating that a test-data signal cannot be received correctly to a result indicating that a test-data signal can be received correctly. The events detected by the AND gate 730, 731 and 732 are used for triggering operations to store delay times P0, P1 and P2 represented by the contents of the counter 710 in the flip-flop sets 750, 751 and 752 respectively. It should be noted that a comparator 743 is used to assure that the delay time on the second boundary P2 is stored in the flip-flop set 752 only after the delay time on the first boundary P0 has been stored in the flip-flop set 750. As a signal 702 indicates the highest delay-stage number, the counter 710 stops counting. The highest delay-stage number is stored in the configuration-information-holding unit 500 in advance.

Then, processing circuits 770 to 778 compute the values of the expressions (P0−Gt−αG0), (P1+Ht+αH) and (P2−Gt−αG1+P1+Ht+αH)/2 from P0, P1 and P2 stored in the flip-flop sets 750, 751 and 752 respectively as well as from the values of delay-time variances 760 and 763, which are output by the configuration-information-holding unit 500, and phase margins 761, 762 and 764, which are output by the configuration-information-holding unit 500 as Gt, Ht, αG0, αG1 and αH respectively. A selector 780 selects one of the computed values of the expressions (P0−Gt−αG0), (P1+Ht+αH) and (P2−Gt−αG1+P1+Ht+αH)/2 as an optimum value 790 in dependence on comparison results generated by comparators 781 and 782.

To put it in detail, an adder 770 computes the value of the expression (P0−Gt−αG0), an adder 771 computes the value of the expression (P2−Gt−αG1) and an adder 772 computes the value of the expression (P1+Ht+αH). An average-value-computing circuit 778 receives the values output by the adders 771 and 772, computing their average as the value of the expression (P2−Gt−αG1+P1+Ht+αH)/2. The comparator 781 compares P0 with (Gt+αG0) to form a judgment as to whether or not (P0−Gt−αG0) is greater than 0. On the other hand, the comparator 782 compares P2 with the longest delay time of the variable-delay circuit, that is, forms a judgment as to whether or not the second boundary P2 exists. The selector 780 selects the output of the adder 770, the average-value-computing circuit 778 or the adder 772 in dependence on comparison results generated by the comparators 781 and 782.

In accordance with the embodiment described above, a common algorithm can be adopted for computing an optimum delay time for any arbitrary phase difference Dj without regard to whether the phase difference is a difference in phase between an input signal and a specific clock pulse or a difference in phase between the input signal and a subsequent clock pulse immediately following the specific clock pulse as long as the input signal can be received correctly by using the subsequent clock pulse as a gating clock pulse. The adoption of such a common algorithm entails merely a number of logic gates required for determining an optimum delay time increasing by involution by the stage count of the variable-delay circuit. In addition, set values of phase margins can be changed to new proper set values in dependence on a criterion as to whether or not manufacturing variations are allowed. Moreover, set values of the phase margins can be changed to new properly greater set values in the expectation that the transmission frequency becomes lower. Thus, a delay time computed by the same hardware adopting the algorithm can be optimized in accordance with a prevalent condition.

Figure 6:
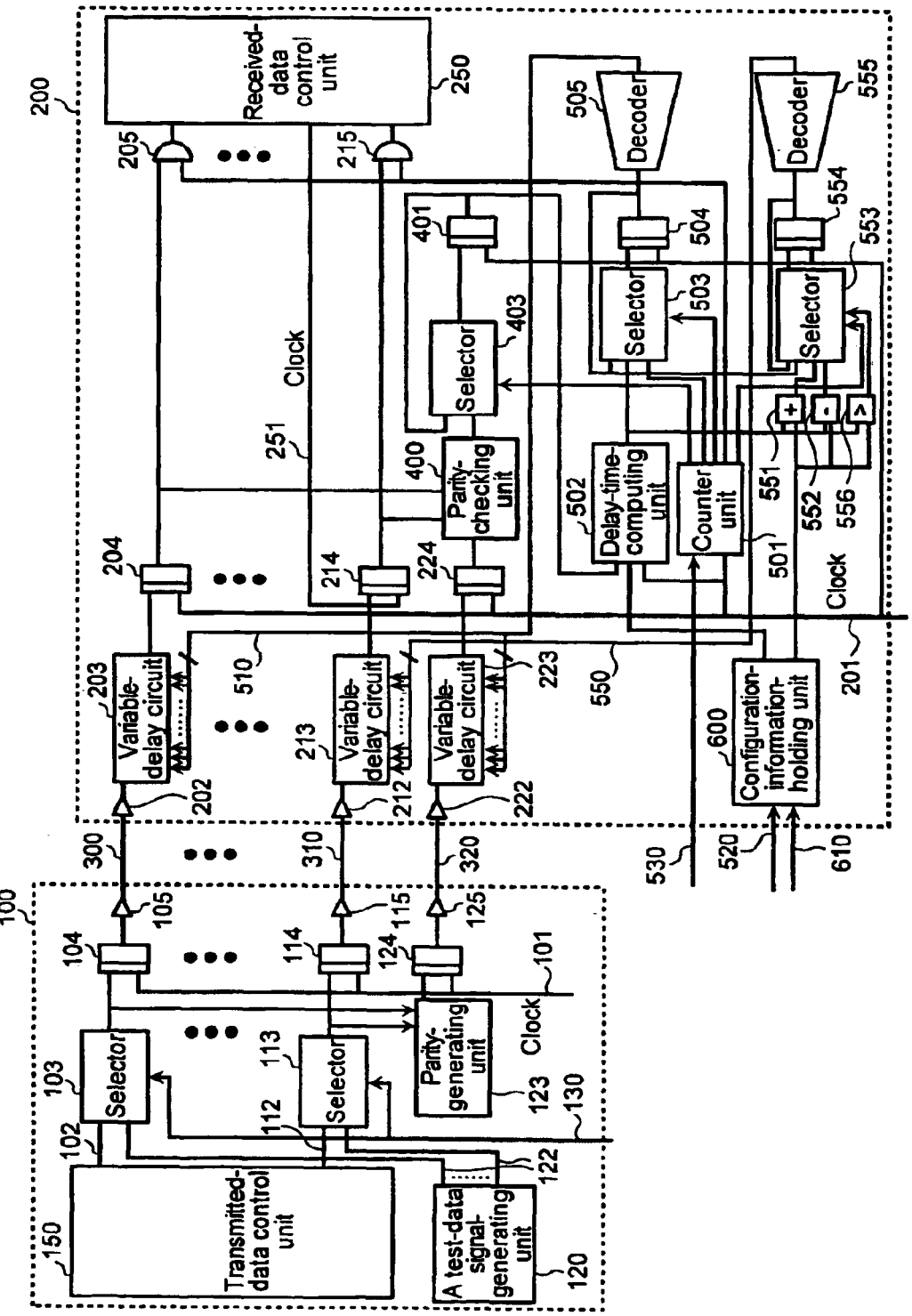
FIG. 6 is a block diagram showing a typical configuration of another embodiment of the present invention.

FIG. 6 is a block diagram showing a typical configuration of another illustrative embodiment of the present invention. Those components of the embodiment of FIG. 6 which are identical to those employed in the embodiment shown in FIG. 1, are denoted by the same reference numerals. The configuration shown in FIG. 6 is different from that shown in FIG. 1 in that, in the case of the reception-side unit 200 employed in the other embodiment shown in FIG. 6, a delay control signal 510 for controlling the delay time of the variable-delay circuits 203 and 223 for controlling the phase of the data signal 102 and the parity-bit signal respectively relative to the clock signal 201 is separated from a delay control signal 550 for controlling the delay time of the variable-delay circuit 213 for controlling the phase of the control signal 112 relative to the clock signal 201. In addition, in order to generate the delay control signal 550, there are separately provided an adder 551, a subtractor 552, a selector 553, a delay-time latch circuit 554 and a decoder 555. Furthermore, a clock signal 251 used in the received-data control unit 250 is used as a clock signal supplied to the flip-flop 214 for receiving the control signal 112.

In an operation to check the parity of test data, a signal output by the counter unit 501 is supplied to the decoder 555 by way of the selector 503, the latch circuit 504, the selector 553 and the delay-time latch circuit 554. The decoder 555 supplies the delay control signal 550 to the variable-delay circuit 213 in order to change the delay time of the variable-delay circuit 213 for the control signal 112 over a range from the shortest delay time to the longest delay time.

In an operation to determine an optimum delay time for the variable-delay circuit 213, on the other hand, a signal output by the delay-time-computing unit 502 as well as information and a predetermined value 610 obtained from an external source through a configuration-information-holding unit 600 are supplied to the adder 551 and the subtractor 552 for generating the delay control signal 550. The delay-time-computing unit 502 computes the signal supplied to the adder 551 and the subtractor 552 in accordance with the algorithm adopted by the embodiment shown in FIG. 1 for generating the delay control signal 510 and explained earlier by referring to FIGS. 4 and 5. The information 520 supplied to the adder 551 and the subtractor 552 is the delay-time variances and the phase margins explained in the description of the embodiment shown in FIG. 1. A delay time of the variable-delay circuit 213 for the control signal 112 is generated by the delay control signal 550, having a predetermined difference from the delay time of the variable-delay circuit 203 for the data signal 102. The selector 553 selects the signal output by the adder 551 or the subtractor 552 on the basis of a signal output by a comparator 556 for comparing the signal output by the delay-time-computing unit 502 with the signal output by the configuration-information-holding unit 600.

Processing to transmit data and processing to receive data may be carried out by the transmitted-data control unit 150 and the received-data control unit 250 respectively at half the transmission frequency between the transmission-side unit 100 and the reception-side unit 200. In this case, the control signal 112 transmitted to accompany the data signal 102 can be transmitted at half the transmission frequency of the data signal 102 to conform to a processing pitch adopted by the transmitted-data control unit 150 and the received-data control unit 250. By using the function described above, a delay time of the variable-delay circuit 213 for the control signal 112 is generated by the delay control signal 550, having a difference of half the data transmission cycle from the delay time of the variable-delay circuit 203 for the data signal 102.

Figure 7:
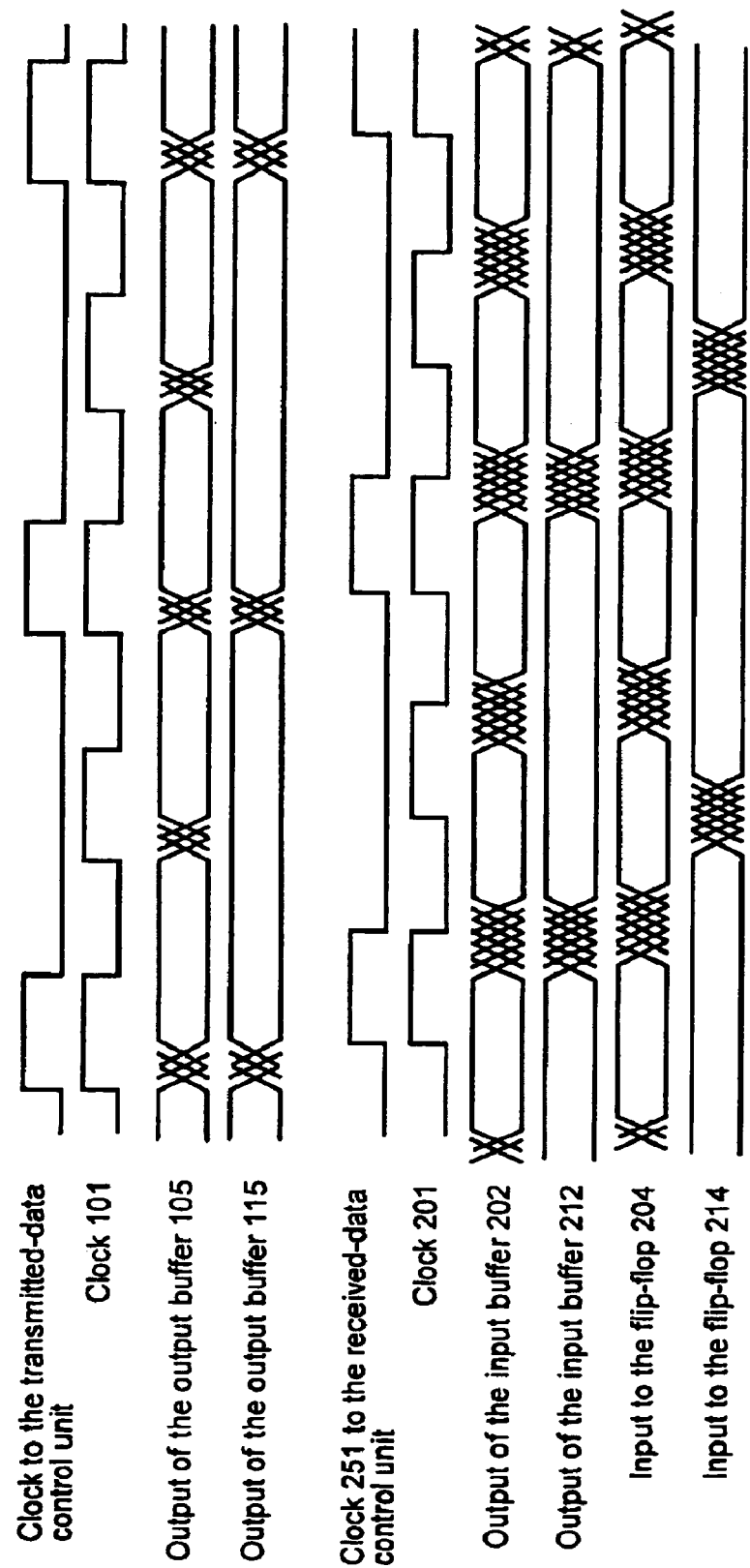
FIG. 7 shows time charts of the other embodiment shown in FIG. 6.

FIG. 7 shows time charts of the other embodiment. As shown in FIG. 7, by transmitting a control signal at half the transmission frequency of a data signal, for the transmission of the control signal, it is possible to guarantee a phase margin equal to twice the phase margin for the transmission of the data signal. As a result, an error related to the reception of the control signal can be prevented from being generated.

Figure 8:
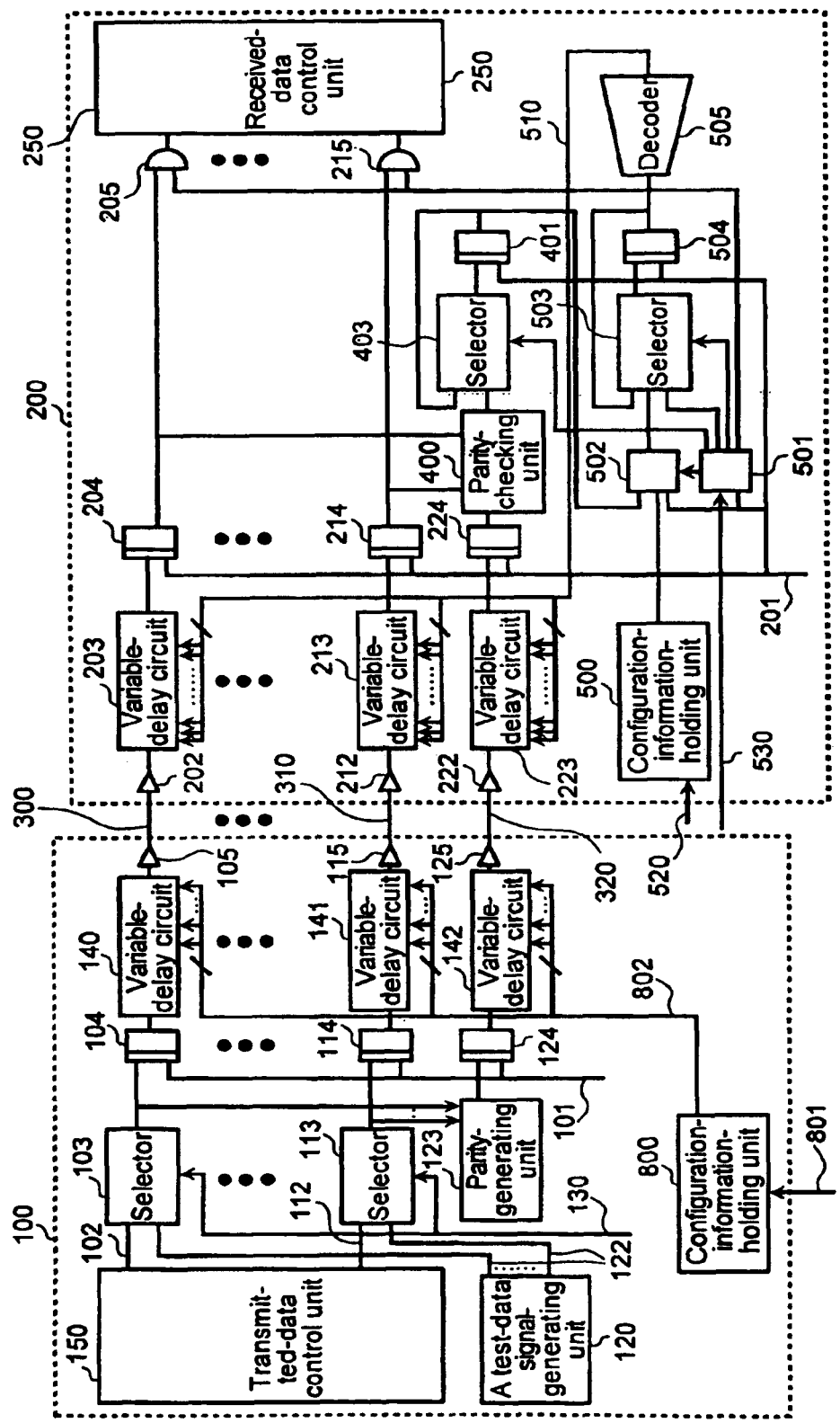
FIG. 8 is a block diagram showing a typical configuration of a further embodiment of the present invention.

FIG. 8 is a block diagram showing a typical configuration of a further illustrative embodiment. Those components of the further embodiment of FIG. 8 which are identical to those of the embodiment shown in FIG. 1, are denoted by the same reference numerals. The configuration shown in FIG. 8 is different from that shown in FIG. 1 in that, the transmission-side unit 100 employed in the further embodiment shown in FIG. 8 also has variable-delay circuits 140, 141 and 142 for changing the phase of the data signal 102, the control signal 112 and the parity-bit signal respectively. A control signal for controlling the delay time of the variable-delay circuits 140, 141 and 142 is generated by a configuration-information-holding unit 800 employed in the transmission-side unit 100 on the basis of delay-time values 802 generated by an external source as a signal 801.

This function to delay transmitted signals can be utilized as follows. In an LSI for outputting a number of signals, as many transmission-side units 100 shown in FIG. 8 as the output signals are provided in the LSI. By supplying different signals 801 to variable-delay-circuit sets of the transmission-side units 100, the output signals are no longer generated at the same time. Thus, it is possible to reduce limitations on efforts to increase the transmission frequency. Such limitations are caused by simultaneous-switching noises accompanying changes in current flowing in an output circuit. Further it is possible to relieve an upper limit of the number of signal pins that can be provided on the LSI package.

Figure 9:
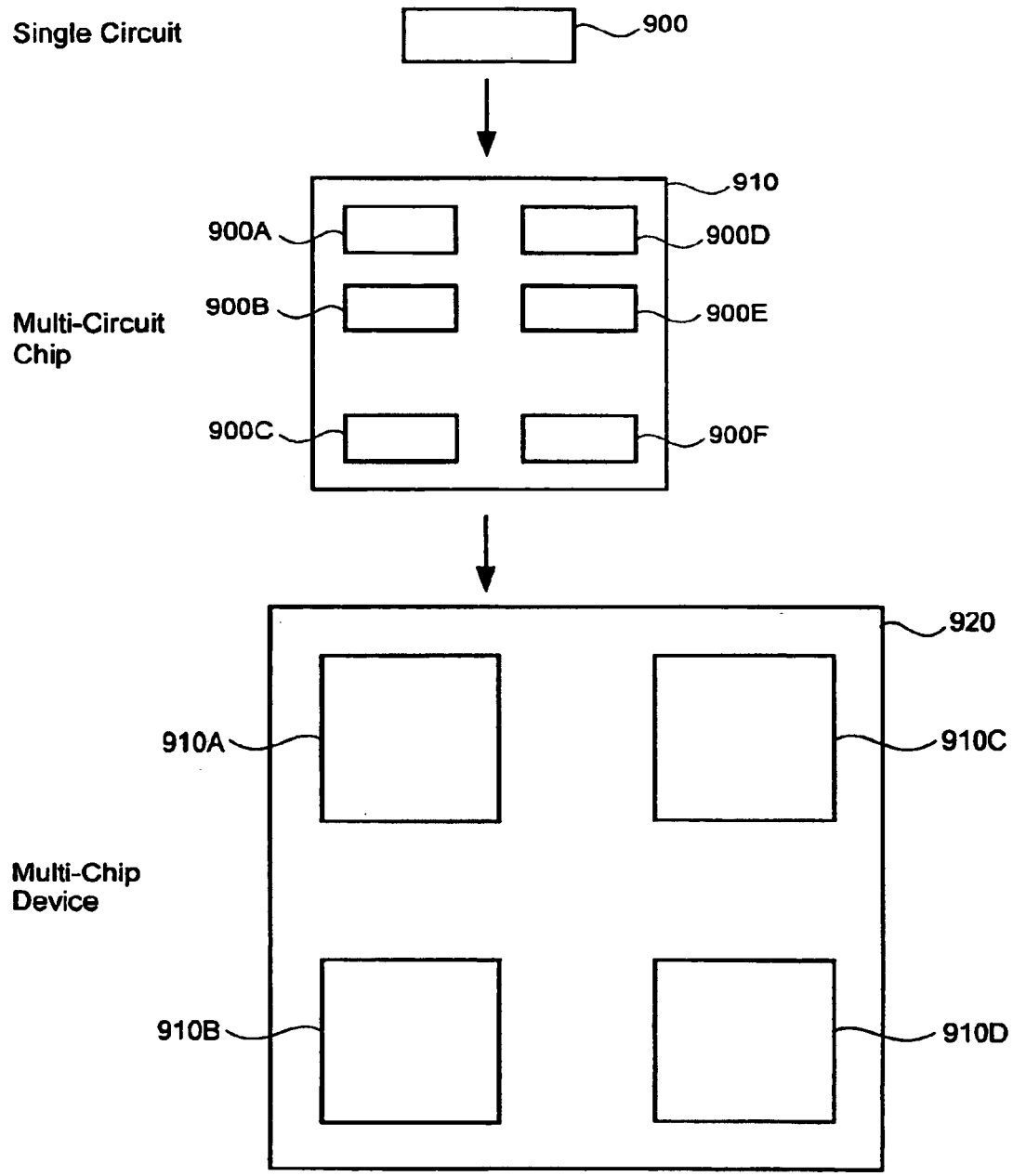
FIG. 9 shows hierarchical configurations of the invention.

Referring now to FIG. 9, the foregoing illustrative embodiments of the present invention are described in another aspect of the invention. FIG. 9 shows in high level schematic form, a hierarchical arrangement of the disclosed circuitry to yield increasingly wider data paths. The illustrative embodiment of the basic reception-side unit 200 shown in FIG. 1 and in the illustrated alternative embodiments shown in FIGS. 6 and 8 are depicted schematically in FIG. 9 by box 900.

The present invention can be embodied in a higher level structure. Thus, a multi-circuit arrangement of the invention can be configured in a chip. This embodiment is shown schematically in FIG. 9 by the chip 910 which comprises a plurality of reception-side circuits 900A–900F, for example. Each circuit 900A–900F operates in accordance with the foregoing discussion of the reception-side circuits shown in FIGS. 1, 6, and 8. The data paths of each circuit 900A–900F are concatenated to form an N×b data path, where N is the number of circuits 900A–900F, and b is the number of bits provided by each circuit.

The present invention can be further embodied in a still higher level structure. Thus, a multi-chip arrangement is possible wherein each chip 910 is configured as discussed above. In the multi-chip configuration, a device comprises plural such chips. Thus, FIG. 9 shows a device 920 which comprises a plurality of chips 910A–910D. Each chip is configured with one or more circuits according to the present invention. The data paths of each chip 910A–910D are arranged to form a still wider data path, of M×N×b, where M is the number of chips 910 in device 920, N is the number of circuits 900 in each chip 910, and b is the bit width of each circuit.

As described above, in accordance with the present invention, when data is exchanged between units driven into operations by asynchronous clock signals having the same frequency but different phases, an optimum delay time can be determined without increasing the number of required logic gates by involution by the stage count of the variable-delay circuits. It is thus possible to increase the number of stages provided in each of the variable-delay circuits which are each capable of controlling the phase of a received signal relative to a clock signal provided for the transmission line in a multi-stage manner. As a result, the phase can be adjusted more finely with a high degree of accuracy and with ease. In addition, the frequency of the data transmission can be increased.

What is claimed is:

1. A method for producing data from an information signal comprising:

receiving a test signal;

delaying said test signal by increasing amounts of delay times to produce a plurality of delayed test signals, each delayed test signal having an associated delay number corresponding to its delay time, said delay number arranged in increasing order of delay time;

evaluating each delayed test signal for an error condition;

reading one or more adjustment values from a first memory store, said adjustment values being received into said first memory store from an external source and so are variable;

producing a first delay value by combining one or more of said delay times with said one or more adjustment values, including selecting one or more of said delay times based on those of said delayed test signals for which error conditions occur;

receiving a transmission of said information signal; and delaying said information signal by an amount of time depending on said first delay value, wherein said information signal becomes synchronized with a clock signal used to produce data from said information signal.

2. The method of claim 1 wherein said producing a first delay value includes:

detecting a delay time P0 associated with the smallest delay number for which its corresponding delayed test signal has an error condition;

detecting a delay time P1 associated with the smallest delay number for which its corresponding delayed test signal has an error condition and for which the next larger delay number has a corresponding delayed test signal that does not have an error condition;

detecting a delay time P2 associated with the largest delay number for which its corresponding delayed test signal has an error condition and for which the previous smaller delay number has a corresponding delayed test signal that does not have an error condition;

combining said delay time P0 with one or more of said adjustment values to produce said first delay value if said combining results in a value greater than zero;

if said combining results in a value less than or equal to zero and said delay time P2 exists, then producing said first delay value as a function of said delay times P1 and P2 with one or more of said adjustment values; and if said combining results in a value less than or equal to zero and said delay time P2 does not exist, then combining said delay time P1 with one or more of said adjustment values to produce said first delay value.

3. The method of claim 1 wherein said evaluating includes performing a parity check.

4. The method of claim 1 wherein said adjustment values include one or more of: one or more factors based on power-supply noise; one or more factors based on device temperature; and one or more factors based on process variations.

5. The method of claim 1 further including:

reading at least one additional adjustment value from a second memory store to produce a second delay value based on said first delay value and on said at least one additional adjustment value, said second memory store either being the same as or different from said first memory store;

receiving a control signal that is associated with said information signal; and delaying said control signal by an amount of time depending on said second delay value, wherein said information signal and said control signal may be delayed by different amounts of time.

6. The method of claim 1 further including:

producing a transmission delay value including reading one or more delay-time values contained in a second memory store; and transmitting said information signal as said transmission of said information signal, including delaying said information signal by an amount of time depending on said transmission delay value.

7. The method of claim 1 as embodied in a device comprising a plurality of substantially identical data circuits, each data circuit operating in accordance with said method.

8. The method of claim 1 as embodied in a device comprising a plurality of chips, each chip comprising one or more identical data circuits, each data circuit operating in accordance with said method.

9. A data circuit system comprising:

a plurality of input data lines for receiving data signals, including test signals;

a first plurality of delay circuits having inputs and outputs, said input data lines coupled to said inputs thereof, said delay circuits configured to produce a delayed data signal, said delay circuits further configured, in response to receiving said test signals, to produce a plurality of delayed test signals each having a different delay time, each delayed test signal having an associated delay number corresponding to its delay time, said delay number arranged in increasing order of delay time;

a data error checking unit coupled to receive said outputs of said first plurality of delay circuits and to produce data error indication signals;

a first rewrite-able memory to store adjustment values, said memory having an input for receiving externally-provided values, said adjustment values thereby being updatable depending on said externally-provided values; and delay-time generation logic configured to produce a first data delay signal indicative of a first data delay time by combining one or more of said delay times with said one or more adjustment values, including selecting one or more of said delay times based on those of said delayed test signals for which error conditions occur, and having an output to output said first data delay signal, said first plurality of delay circuits having delay control inputs coupled to receive said first data delay signal so as to delay said data signals by an amount of time substantially equal to said first data delay time.

10. The data circuit system of claim 9 wherein said delay-time generation logic comprises:

first logic circuits configured to receive a delay time P0 associated with the smallest delay number for which its corresponding delayed test signal has an error condition, a delay time P1 associated with the smallest delay number for which its corresponding delayed test signal has an error condition and for which the next larger delay number has a corresponding delayed test signal that does not have an error condition, and a delay time P2 associated with the largest delay number for which its corresponding delayed test signal has an error condition and for which the previous smaller delay number has a corresponding delayed test signal that does not have an error condition;

second logic circuits configured to combine said delay time P0 with one or more of said adjustment values to produce a first candidate value;

third logic circuits configured to combine said delay time P1 with one or more of said adjustment values to produce a second candidate value;

fourth logic circuits configured to produce an alternate second candidate value as a function of said delay times P1 and P2 with one or more of said adjustment values;

fifth selection logic configured to select said first candidate value as said first data delay time if said first candidate value is greater than zero;

sixth selection logic configured to select said second candidate value as said first data delay time if said first candidate value is less than or equal to zero and if said delay time P2 is determined to be non-existent; and seventh selection logic configured to select said alternate second candidate value as said first data delay time if said first candidate value is less than or equal to zero and if said delay time P2 is determined to exist.

11. The data circuit system of claim 9 wherein said data error checking unit comprises parity checking logic.

12. The data circuit system of claim 9 wherein said adjustment values include one or more of: one or more factors based on power-supply noise; one or more factors based on device temperature; and one or more factors based on process variations.

13. The data circuit system of claim 9 further including:

one or more control lines;

a second plurality of delay circuits having inputs and outputs, said control lines coupled to said inputs thereof, said outputs thereof producing delayed control signals; and a second rewrite-able memory for storing at least one additional adjustment value, said delay-time generation logic further having a second output to produce a second data delay signal indicative of a second data delay time, said second data delay time being a function of said first data delay time and said at least one additional adjustment value, said second plurality of delay circuits having delay control inputs coupled to receive said second data delay signal output, thereby producing said delayed control signals.

14. The data circuit system of claim 9 further including an information transmitting circuit comprising:

a second plurality of delay circuits;

a second rewrite-able memory to store a transmission delay value, said memory having an input for receiving externally-provided values, said transmission delay value thereby being updateable depending on said externally-provided values; and logic operatively coupled to said second rewrite-able memory and configured to produce a transmission delay signal based on said transmission delay value, said second plurality of delay circuits configured to receive said transmission delay signal, said second plurality of delay circuits configured to receive information for transmission, said information for transmission being delayed by an amount corresponding to said transmission delay signal.

15. The data circuit system of claim 9 as incorporated in a device comprising a plurality of said data circuit systems.

16. The data circuit system of claim 9 as incorporated in a device comprising a plurality of chips, each chip having one or more of said data circuit systems.

17. A data circuit system comprising:
means for receiving data signals, said data signals including test signals;
means for delaying said data signals by a variable delay amount;
means for detecting errors in received data signals;
first means for receiving externally provided values and storing them as first adjustment values; and
means for producing one or more first delay control signals representative of a first delay value, including first means for producing one or more candidate delay values based on errors detected by said means for detecting and on said first adjustment values, said first delay value being one of said one or more candidate delay values,
said one or more first delay control signals coupled to said means for delaying said data signals to delay said data signals by an amount of time substantially equal to said first delay value.

18. The data circuit system of claim 17 further including:
means for receiving a control signal associated with said data signals;
means for delaying said control signal by a variable delay amount; and
second means for receiving externally provided values and storing them as one or more second adjustment values; and
means for combining said first delay value and said one or more second adjustment values to produce a second delay control signal representative of a second delay value,
said delay control signal coupled to said means for delaying said control signal to delay said control signal by an amount to time substantially equal to said second delay value.

19. The data circuit system of claim 17 further including:
second means for receiving externally provided values and storing them as second adjustment values;
second means for determining a delay value to produce a transmission delay value based on said second adjustment values;
second means for producing one or more second delay control signals from said transmission delay value; and
means for transmitting information signals, including means for delaying transmission of said information signals by an amount of time substantially equal to said transmission delay value,
said information signals including said data signals.

20. The data circuit system of claim 17 as incorporated in a device comprising a plurality of said data circuit systems.

* * * * *